Dec. 24, 1957  G. H. ROGGENKAMP  2,817,802
REVERSIBLE MOTOR WITH DYNAMIC BRAKING
Filed July 8, 1953  3 Sheets-Sheet 3
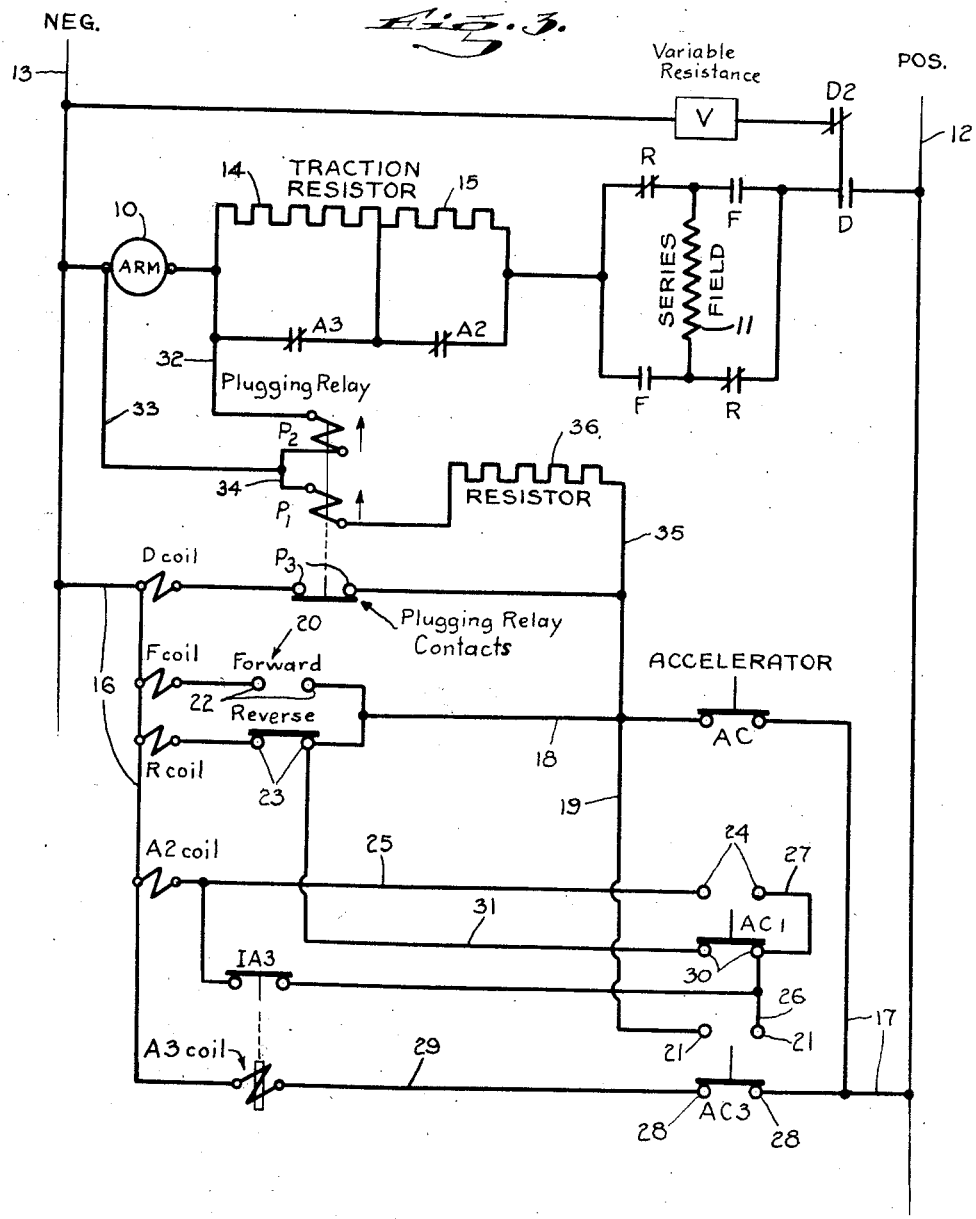
INVENTOR
George Roggenkamp
BY
A. H. Golden
ATTORNEY United States Patent Office 2,817,802
Patented Dec. 24, 1957

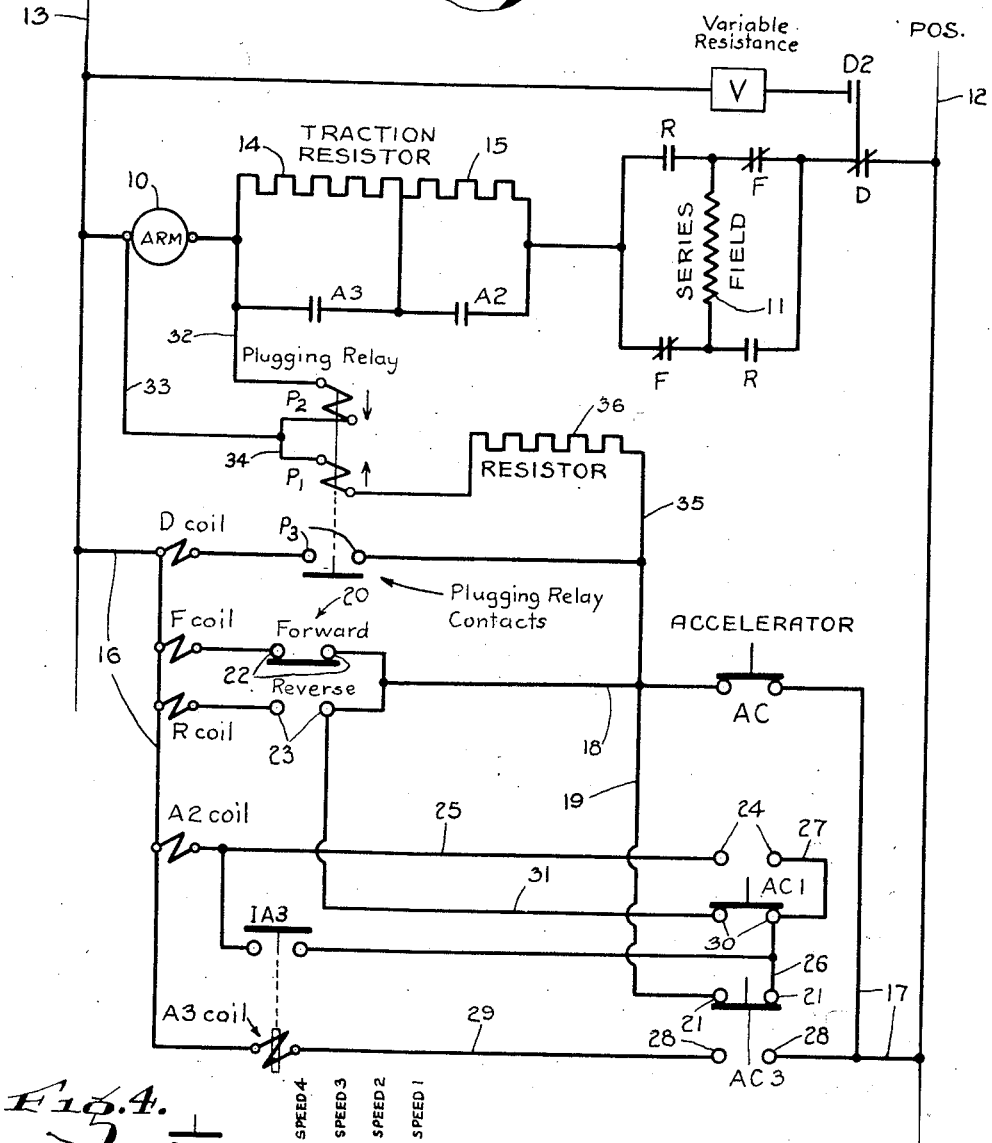
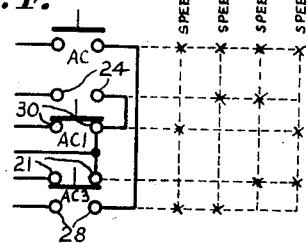

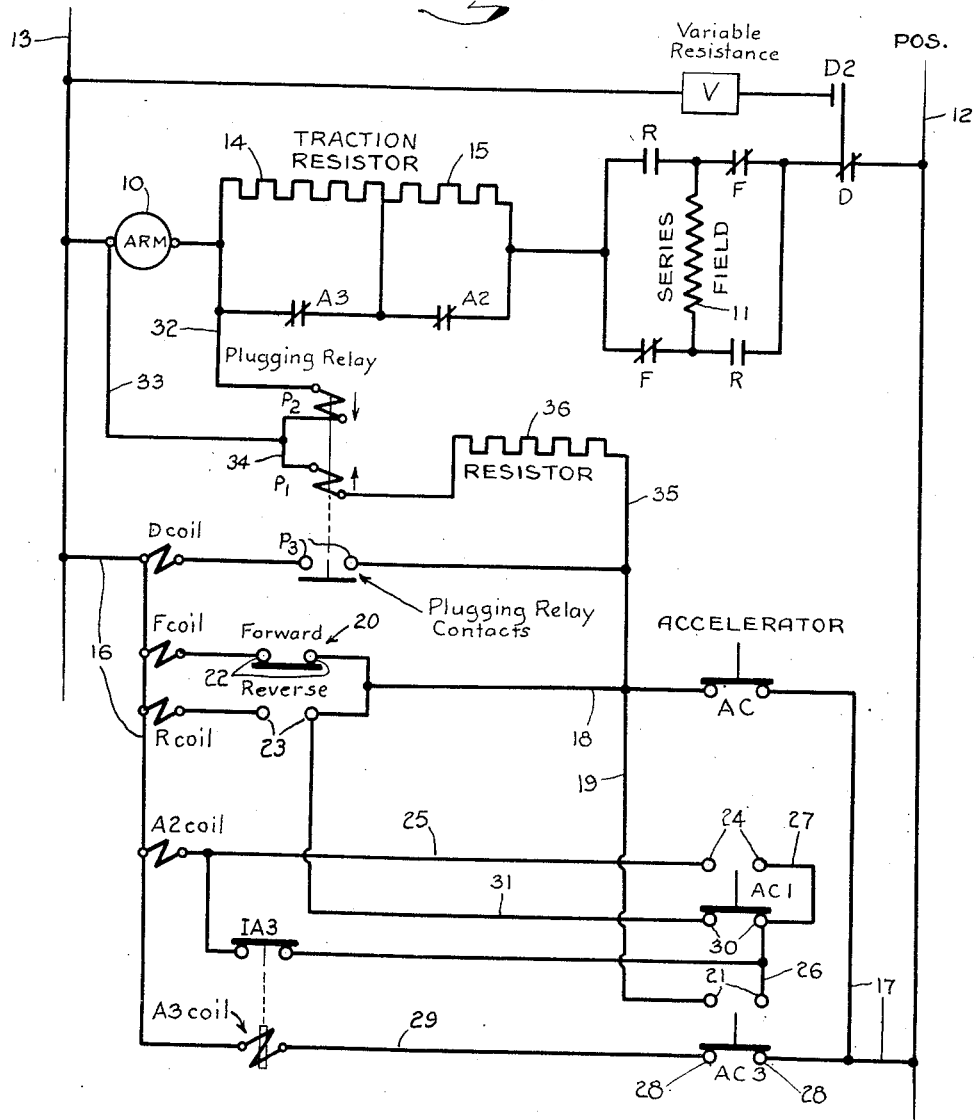

2,817,802
REVERSIBLE MOTOR WITH DYNAMIC BRAKING

George H. Roggenkamp, Chicago, Ill., assignor to The Yale & Towne Manufacturing Company, Stamford, Conn., a corporation of Connecticut Application July 8, 1953, Serial No. 366,654

9 Claims. (Cl. 318—284)

This invention relates to a dynamic brake particularly adapted for use on an electric industrial truck.

The invention further relates to means for preventing the reversal of the current flow in a truck motor while the truck is moving.

Those skilled in the art fully appreciate that operators of electric industrial trucks frequently reverse the motor of the truck they are driving prior to bringing the truck to a complete stop. As a matter of fact, this type of operation, called "plugging," is quite commonly used to bring a truck to a quick stop, although it is very damaging to the truck. Various means have been developed in the art for preventing plugging, and my invention relates to a new and novel means whereby not only do I prevent plugging, but also effect the dynamic braking of the truck through utilization of the driving motor as a generator.

As an important feature of my invention, I contribute novel means whereby the plugging of the motor, that is, its reversal when it is moving in a particular direction, disconnects the motor from the power line and closes an internal circuit for the motor. It becomes impossible therefore to reverse the motor while it is moving.

More particularly, I provide means in the form preferably of a switch that normally holds closed a directional power circuit for the motor, this switch being controlled by a part of the motor circuit. This switch opens the power circuit and closes an internal motor circuit for braking the truck whenever the motor circuit is actuated to change its direction while the motor actually is rotating to drive the truck.

As a more detailed feature of my invention, I utilize what I term a plugging relay having two coils, the excitation of both coils being required to bring about the movement of the armature of the coil for the closing of the plugging relay contacts. I arrange to have current flow through one of the coils of the plugging relay in one direction upon the closing of the circuit of the motor for movement of the truck in a particular direction. The counter E. M. F. developed by the motor when moving in this particular direction flows through the other coil of the plugging relay in a direction opposed to that of the current flowing in the first relay coil. Therefore, the relay is inoperative to move its contacts into closed position. However, upon reversal of the motor circuit during such time as the truck is moving in a particular direction, the current generated by the motor acting then as a generator, will effect excitation of the second coil in a direction opposed to the first direction and parallel to the excitation of the first coil of the plugging relay. Since both coils of the plugging relay are now pulling in the same direction, the contacts of the relay will be closed and this will effect the immediate breaking of the circuit of the motor. However, the internal circuit of the motor and its field coils will be closed, with the current thus generated flowing through suitable resistance, it being obvious, of course, that this action of the motor as a generator will effect the dynamic braking thereof and that this braking will be inversely proportional to the resistance through which the current must flow as well as the speed of the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a schematic drawing of the electric circuit of a truck utilizing my invention and operating in first speed.

Fig. 2 is a view similar to Fig. 1 with the truck operating in fourth speed.

Fig. 3 is a view of the parts of Fig. 2, but with the motor plugged for operation in a reverse direction to that of Fig. 2; in other words, while the circuit is in the condition of Fig. 2, the truck operator has reversed the series field of the motor, and the anti-plugging features of my invention together with the dynamic braking feature thereof are in effect.

Fig. 4 shows the accelerator sequence chart.

In the electric circuit that I show in the drawings, the armature 10 and field coil 11 represent parts of a conventional truck motor connected across the positive and negative sides 12, 13 of the supply line, with a traction resistor having parts 14, 15 interposed between the armature 10 and field coil 11. I shall note here that my invention utilizes normally closed contacts D that I show between the field coil 11 and the positive side 12 of the line, but, to provide a complete understanding of my invention, I shall first describe the more conventional parts of the circuit.

The resistor parts 14, 15 have different resistance values and can be shorted out individually or together by contacts that I show at A2 and A3, thereby controlling the motor speed. Also, the opposed ends of the field coil 11 are adapted to be connected to the traction resistor 14, 15 and to the positive line 12 through either a pair of contacts F or a pair of contacts R. The arrangement is such that the pairs of contacts F and R can establish opposed directional circuits, with the closing of the contacts F conditioning the motor to drive the truck in a forward direction, and with the opening of these contacts F and closing of the contacts R reversing the field of the coil 11 relatively to the armature 10 whereby the motor drives the truck in a reversed direction.

For closing the contacts A2, A3, F and R, I utilize a corresponding A2-coil, A3-coil, F-coil and R-coil, each of these coils being energized through a rather usual auxiliary circuit. Thus, each coil is connected at one side to the negative side 13 of the line through a wire 16, and at the other side to the positive line 12 through an accelerator or controller having switches AC, AC1, and AC3. As my description proceeds, the different speed positions of accelerator switches AC, AC1, and AC3 will be understood through reference to the sequence chart that is shown in Fig. 4. In that chart, the closing of the contacts in each position is indicated by X. A wire 17, Fig. 1, connects one contact of switch AC to the positive side 12 of the line, and wires 18, 19 connect the other contact of this switch to a directional switch 20 and to one of a pair of contacts 21 in switch AC3. By manual operation of the switch 20, the wire 18 is placed in circuit with either the F-coil or the R-coil through corresponding contacts 22, 23. Switch AC closes as the accelerator moves to first speed position, as shown in Figs. 1 and 4, thereby energizing the F-coil or R-coil, depending upon the position of switch 20, to close the corresponding directional contacts F or R. Circuits are also closed at 30 and 21 when the accelerator is in first speed position.

In the second speed position of the accelerator, switch AC remains closed as indicated in Fig. 4. The circuit at 30 is opened and a circuit through a pair of contacts 24 is closed. One contact 24 is connected to A2-coil through wire 25, Fig. 1, and the other contact 24 is connected to a contact 21 through wires 26, 27. Because contacts 21 and 24 are closed, A2-coil, therefore, is energized to close contacts A2, thereby shunting out the part 15 of the traction resistor and increasing the speed of the motor.

In the third speed position of the accelerator, Fig. 4, switch AC remains closed, as also is the circuit through contacts 24, but switch AC3 now opens the circuit at contacts 21 and closes a circuit through contacts 28. One contact 28 is connected by wire 17 to the positive side 12 of the line, and the other through a wire 29, Fig. 1, to A3-coil. With contacts 21 open, contacts 24 are no longer connected to the positive line 12 and A2-coil is not energized, but, because contacts 28 are closed, A3-coil is energized. Thereby contacts A3 close while contacts A2 are open, so that resistor part 14 is shunted out while part 15 remains in the motor circuit. Because resistor part 15 has a smaller resistance value than part 14, the motor speed is further increased.

In the fourth speed position of the accelerator, shown in Figs. 2 and 4, switch AC remains closed, as also do the contacts 28, and A3-coil remains energized. Now, however, switch AC1 opens contacts 24, as was the case in its first speed position, and closes contacts 30, thereby connecting wire 26 to the positive side 12 of the line through wires 31 and 18 and switch AC, as shown in Fig. 2. Further, an interlocking switch IA3 is closed, having been actuated mechanically by the closing of contacts A3. Switch IA3 connects A2-coil to wire 26, and because wire 26 is now connected to the positive side of the line, A2-coil is energized. With A2-coil and A3-coil now both energized, traction resistor 14, 15 is entirely shunted out and the truck motor is conditioned to operate at full speed.

I shall now proceed with the description of the extremely novel features of my invention whereby I am able to utilize the circuit described to prevent plugging of the motor, and also to effect dynamic braking of the truck. I provide what I term a plugging relay having two coils P1 and P2, with both of these coils acting upon a single armature that is adapted to close contacts P3 designated in the drawings also as the plugging relay contacts. The coil P2 is connected across opposed sides of the motor armature 10 through wires 32, 33 and this coil P2 thereby is responsive to counter E. M. F. developed by the motor. One side of coil P1 is connected by wire 34 to the same side of coil P2 as is the wire 33. The other side of coil P1 is connected to the positive side 12 of the supply line through a wire 35 and accelerator switch AC. Between coil P1 and switch AC I show a resistor 36 that limits the current in coil P1.

With the truck in normal operation, driven in a forward direction, the current flows through the coil P1 in the direction indicated by an arrow in Figs. 1 and 2, and the counter E. M. F. developed by the motor causes current to flow in an opposed direction through coil P2, as indicated by its arrow. The coils P1 and P2 therefore oppose each other, and the magnetic pull developed by the coils is insufficient to move their armature to close the plugging relay contacts P3. If, with the circuit in this condition, and with the truck moving in a forward direction, the motor circuit is reversed or "plugged," my invention goes into action, all as best shown in Fig. 3. In Fig. 3, the circuit is in fourth speed and the directional switch 20 must be considered as having just been thrown from forward to reverse while the truck was moving at full speed forward. Current now flows through coil P2 in a reversed direction indicated by the arrow in Fig. 3, because the motor is acting as a generator. In this condition of the circuit, coils P1 and P2 act together, and the magnetic pull is then sufficient to close the plugging relay contacts P3 as shown in Fig. 3.

I utilize this action of the plugging relay to control the contacts D, to which I have already referred in describing the motor circuit. For this purpose, plugging relay contacts P3 are in series with D-coil. D-coil, when energized by closing of contacts P3, as in Fig. 3, opens contacts D and simultaneously closes contacts D2. This disconnects the motor field coil 11 from the positive side 12 of the line thereby effectively stopping the plugging operation of the motor.

With contacts D2 closed by D-coil simultaneously with the opening of contacts D, there is established in the motor an internal dynamic braking circuit through the armature 10 and field coil 11, and also through the traction resistors 14, 15 when these resistors are not shunted out. Because I can control the traction resistor 14, 15 through the accelerator, I am able to utilize the accelerator to vary the dynamic braking effect of the motor. When the accelerator is in full speed position, as shown in Fig. 3, the traction resistor 14, 15 is, of course, entirely shunted out, and to reduce the severity of the braking action in this condition of the traction resistor, I prefer to place a variable resistance V in the braking circuit between contacts D2 and the negative side 13 of the line.

It may be well to review now the operation of my novel dynamic brake circuit. Referring first to Fig. 1, the motor circuit is closed in first speed through the depression of the accelerator and the closing of the forward directional switch contacts 22, thus effecting a flow of current through the F-coil, and the closing of the forward contacts F, F. The current will now flow from the positive side of the line through the normally closed contact points at D, through the series field coils 11 and contacts F, F, the traction resistor 14, 15 and armature 10 to the negative side 13 of the line. Current will also flow from the positive side 12 of the line through the coil P1 of plugging relay to the negative side 13 of the line. The current will flow through the plugging relay coil P2 in an opposite direction, this being demonstrated by the two arrows in Fig. 1.

Because the current flows in opposed directions through the two relay coils P1 and P2, there will not be enough pull on the relay to close the relay contacts P3, and therefore D-coil will not be energized. This will allow, as has already been indicated, the maintenance in closed position of contacts D, and the holding of contacts D2 in open position.

With the circuit in fourth speed, as shown in Fig. 2, the accelerator has been depressed to effect closing of switches AC1, IA3 and AC3. This action of the accelerator has served to close a circuit through coils A2 and A3, shunting out the traction resistor 14, 15, and allowing the motor to operate at full speed. In Fig. 3, I show exactly what happens when the operator moves the directional switch 20 to reverse the truck motor while the truck is moving at full speed in the condition of the circuit in Fig. 2.

In the first place, the F-coil will be deenergized and contacts F, F will open while at the same time, through the closing of the circuit of R-coil, the reverse contacts R, R will be closed. However, the armature 10 will still rotate in the same direction as before because of the momentum of the truck, thereby effecting a reversal of the current flowing through the relay coil P2, as can be seen by comparing the arrows in Fig. 3 to the arrows in Fig. 2. It is obvious that the plugging relay will now be effective to close the contacts P3 thereof. This will, of course, immediately close a circuit through the D-coil. The closing of the circuit through the D-coil will effect the opening of the contacts D and the closing of the contacts D2, all as shown in Fig. 3.

It will now be noted that the motor is no longer across the line 12, 13. As a matter of fact it is completely disconnected from the line 12, and all before any plugging of real consequence has occurred. The motor, because of its movement, will now generate current which must flow through the resistance V to effect the dynamic braking of the truck. To start the truck thereafter, the circuit through coil P1 must be broken to allow contacts D to close and contacts D2 to open. The switch AC will break the circuit through coil P1 if the accelerator is placed momentarily in neutral position. It can thus be seen that I contribute extremely simple means through which I not only prevent the plugging of my motor, but also obtain the effective operation of the motor as a dynamic brake.

I believe that those skilled in the art will now understand the operation and advantages of my novel dynamic braking circuit, and that the very considerable value of my contribution will be fully appreciated.

I now claim:

1. In a combination of the class described, a power circuit, a dynamic braking circuit, a motor normally connected in said power circuit for driving in either of opposite directions and adapted also for connection into said dynamic braking circuit, a relay armature, means through which said relay armature when in a particular position disconnects the motor from the power circuit and places the motor in the braking circuit, a first relay coil tending to move the relay armature to said particular position when the motor is energized, a second relay coil, means connecting said second relay coil in circuit with a part of said motor to oppose normally the effect of the first coil whereby to prevent movement of the relay armature to said position by the first coil, and the said part of the motor acting to reverse the effect of said second relay coil when the motor is reversed during rotation whereby both relay coils move the relay armature to said particular position to effect braking of the motor.

2. In a combination of the class described, a power circuit, a dynamic braking circuit, a motor having an armature normally connected in said power circuit for driving in either of opposite directions and adapted also for connection into said dynamic braking circuit, a relay armature, means through which said relay armature when moving to a particular position disconnects said motor from said power circuit and places the motor in the braking circuit, first and second relay coils, a circuit through which said first relay coil is excited when said motor is energized whereby said coil tends to move said armature to said position, means connecting said second relay coil across the motor armature with said second coil normally opposing the effect of the first coil whereby to hold the relay armature against movement by the first coil, and said motor armature reversing the effect of said second coil when the motor acts as a generator whereby both relay coils move the relay armature to said particular position to effect braking of the motor.

3. In a combination of the class described, a power circuit, a motor and a traction resistor normally connected in said power circuit, a controller acting through said traction resistor to vary the speed of the motor, a relay armature, a dynamic braking circuit, means through which said relay armature when moving to a particular position disconnects the motor from the power circuit and places the motor in the braking circuit, a first relay coil tending to move the relay armature to said position when the motor is energized, a second relay coil, means connecting said second relay coil in circuit with a part of said motor to oppose normally the effect of the first coil whereby to hold the relay armature against movement by the first coil, said second relay coil reversing its effect when the motor is reversed during rotation whereby both relay coils move the relay armature to said particular position to effect dynamic braking of the motor, and said controller then varying the braking effect through said resistor.

4. In a combination of the class described, a motor, means through which the motor is normally connected across a power line for driving in either of opposite directions, a relay armature for effecting the opening and closing of the motor circuit across said power line, a dynamic braking circuit, means through which said relay armature when moving to a particular position opens said motor circuit and places the motor in the braking circuit, first and second relay coils for said armature, means placing said first relay coil across the line when said motor is energized whereby said coil tends to move said relay armature to said particular position, means connecting said second relay coil across a part of the motor with said second coil normally opposing the effect of the first coil whereby the relay armature maintains the motor circuit closed and the braking circuit open, the said part of the motor reversing the effect of said second coil when the motor is reversed during rotation in a particular direction, and said first and second relay coils when acting together moving the relay armature to its said particular position whereby to effect dynamic braking of the motor.

5. In a combination of the class described, a motor, normally closed contacts through which the motor is connected across a power line for driving in either of opposite directions, a relay armature for effecting the opening and closing of the motor circuit across said power line, a first relay coil for controlling said armature, means through which said coil is excited when said motor is energized whereby said coil tends to move said relay armature to open said motor circuit, a second coil for said relay armature connected in circuit with a part of said motor to oppose normally the effect of the first coil whereby the relay armature does not move to open the motor circuit, means for reversing the motor, the said part of the motor effecting reversal of the field of said second relay coil when the motor is reversed during rotation in a particular direction, and said first and second relay coils when acting together moving the relay armature to open said motor circuit.

6. In a combination of the class described, an electric motor having an armature and field coils, directional power circuits for said motor, switch means at one point in said power circuits acting when in a normal position to hold the circuits closed at that point, a directional switch for closing either directional circuit to place the motor across power lines when the switch means are in said normal position, said switch means when moving from normal position to a second position opening said power circuits at said one point, an internal circuit that when closed includes the motor armature for effecting the operation of said armature to generate current, means whereby said switch means when opening said power circuits at said point close said internal circuit, relay means actuated by one of said power circuits when that circuit is closed by said directional switch for driving said motor in one direction while said motor rotates actually in a reverse direction and means through which said relay means when actuated move the switch means to second position whereby to disconnect the motor from the power lines and place the motor in the internal circuit.

7. In a combination of the class described, an electric motor having an armature and field coils, directional power circuits for said motor including a resistor, an accelerator for varying the resistance of said resistor and therefore the speed of said motor, switch means at one point in said power circuits acting when in a normal position to hold the circuits closed at that point, a directional switch for closing either directional circuit to place the motor and resistor across power lines when the switch means are in said normal position, said switch means when moving from normal position to a second position opening said power circuits at said one point, an internal circuit that when closed includes said armature and resistor, means whereby said switch means when opening said power circuits at said one point close said internal circuit for effecting the operation of said armature to generate current whereby to brake the motor, relay means actuated by one of said power circuits when that circuit is closed by the directional switch for driving said motor in one direction while said motor rotates actually in a reverse direction, means through which said relay means when actuated move the switch means to second position whereby to place the motor in the internal circuit, and said accelerator then effective by varying the resistance of said resistor to control the braking speed of the motor.

8. In a combination of the class described, an electric motor having an armature and field coils, directional power circuits for said motor, switch means at one point in said power circuits acting when in a normal position to hold the circuits closed at that point and thereby enabling either circuit to place said motor across power lines, said switch means when moving from said normal position to a second position opening said power circuits at said point, an internal circuit that when closed includes said motor armature, means whereby said switch means when opening said power circuits at said point close said internal circuit for effecting the operation of said armature to generate current, a relay coil, means connecting said relay coil in circuit with a part of said motor to excite said relay coil, the said part of the motor acting to reverse the field of said coil upon the closing of one of said directional power circuits for driving said motor in one direction while said motor is rotating in a reverse direction, and means whereby said relay coil acts when its field is reversed to move said switch means to its second position whereby to open the power circuits and close the internal circuit.

9. In a combination of the class described, an electric motor, normally closed contacts through which the motor is connected across a power line, a control relay for effecting the opening of the motor circuit across said power line and comprising a first relay coil and a second relay coil, means through which said first relay coil is excited when said motor is energized, said first relay coil being biased to condition said control relay to open said motor circuit, the second relay coil for said relay control being connected in circuit with a part of said motor and normally biased to oppose the effect of the first relay coil when the motor is energized whereby the control relay is neutralized and conditioned so that said motor circuit remains closed, means for reversing the motor, and said motor when reversed during rotation in a particular direction effecting reversal of the said second relay coil so that both coils then are biased to operate together whereby to condition the control relay to open said motor circuit.

References Cited in the file of this patent
UNITED STATES PATENTS

| | | |
|---|---|---|
| 1,112,925 | Lutz | Oct. 6, 1914 |
| 1,240,623 | Taylor | Sept. 18, 1917 |
| 1,387,595 | De Camp | Aug. 16, 1921 |
| 2,378,785 | Ogden | June 19, 1945 |